United States Patent [19]
Bellefeuille

[11] Patent Number: 5,554,285
[45] Date of Patent: Sep. 10, 1996

[54] FILTERING APPARATUS FOR SINK DRAIN PIPE

[75] Inventor: René Bellefeuille, 1949, rue St-Philippe, Trois-Riviéres (Québec), Canada, G9A 4V4

[73] Assignees: René Bellefeuille; Gilles Marin, both of Trois-Riviéres, Canada

[21] Appl. No.: 531,756

[22] Filed: Sep. 21, 1995

[51] Int. Cl.$^6$ .................... B01D 29/03; B01D 35/027
[52] U.S. Cl. .................... 210/449; 210/460; 210/532.2
[58] Field of Search .................... 210/407, 413, 210/446, 447, 449, 451, 455, 459, 460, 532.1, 532.2; 4/286, 290, 291, 292, 652, DIG. 14, DIG. 19

[56] References Cited

U.S. PATENT DOCUMENTS

| | | | |
|---|---|---|---|
| 3,814,261 | 6/1974 | Morgan, Jr. | 210/453 |
| 3,986,963 | 10/1976 | Maroschak | 210/532.2 |
| 4,319,998 | 3/1982 | Anderson | 210/532.2 |
| 4,597,871 | 7/1988 | Okouchi et al. | 210/456 |
| 5,078,874 | 1/1992 | Sullivan | 210/460 |
| 5,354,465 | 10/1994 | Tollison | 210/460 |

FOREIGN PATENT DOCUMENTS 2059758 9/1992 Canada.

Primary Examiner—W. L. Walker
Attorney, Agent, or Firm—François Martineau

[57] ABSTRACT

A water filtration system for use with a sink, comprising: (a) a main housing member, circumscribing an enclosure subdivided into first and second compartments by an intermediate upright partition wall; (b) a fluid intake, mounted into the first compartment and adapted to be fluidingly connected to the drain pipe of the sink; (c) a water outlet, mounted into the second compartment and adapted to be fluidingly connected to a sewer line; wherein the partition wall defines a lower water-tight portion and an upper portion having a plurality of bores, the bores sized for macroparticulate contaminant screening of the fluid wherein purified water only is allowed through the partition wall upper portion and into the second compartment; (d) a tray, releasably engaged into the first compartment for collecting the macroparticulate contaminant screened by the partition wall upper portion; and (e) an elbowed siphon duct, mounted into the second compartment and operatively coupled to the water outlet, for escape of purified water from the enclosure to the sewers.

5 Claims, 2 Drawing Sheets

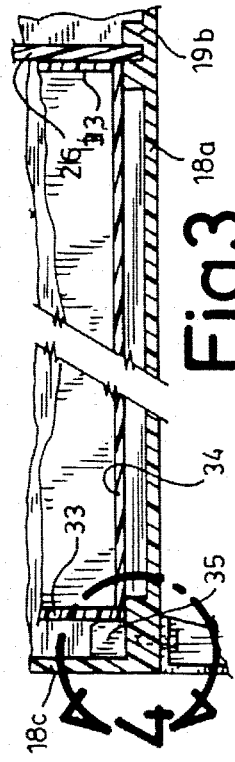
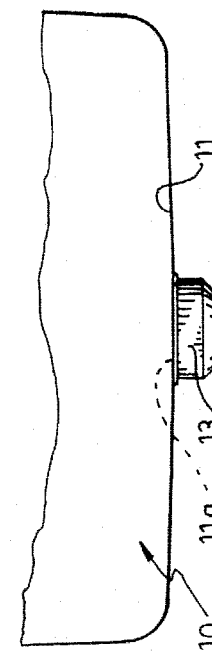
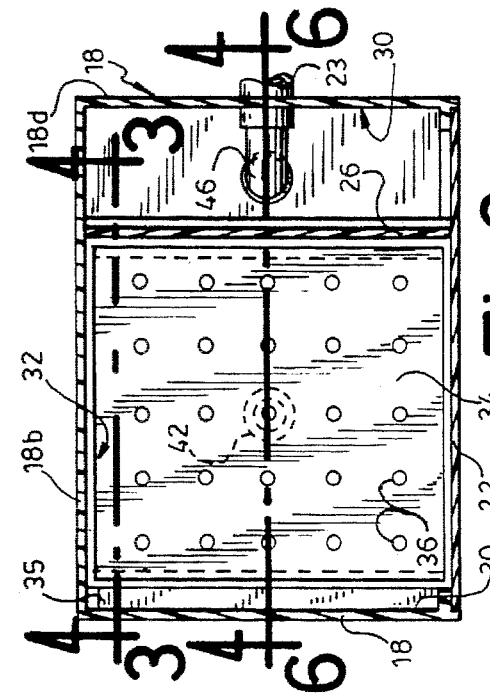
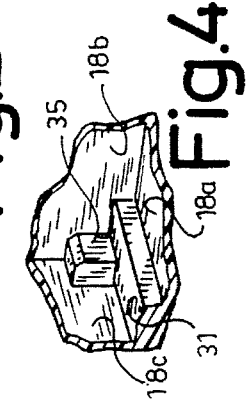
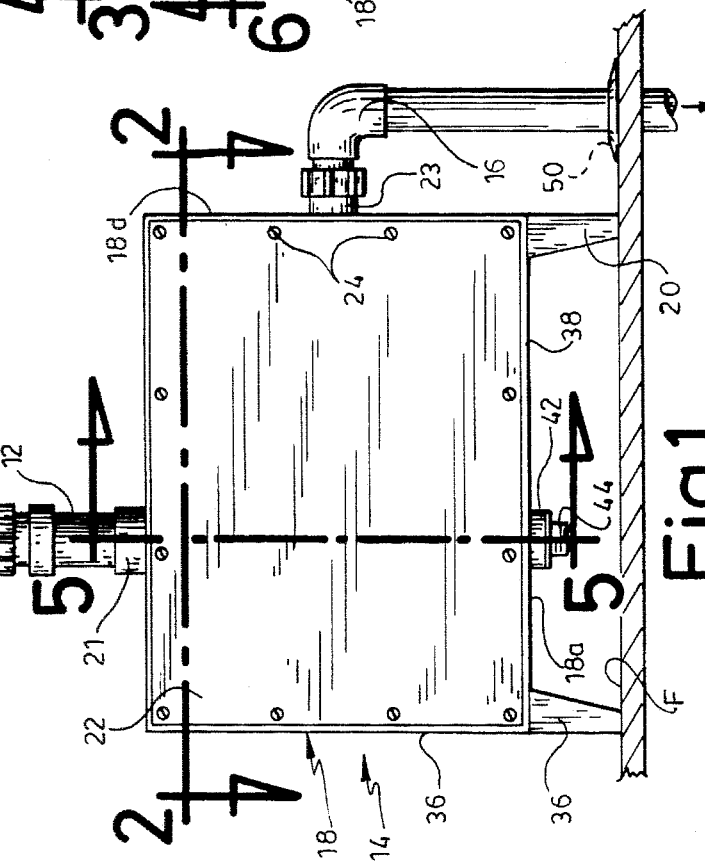

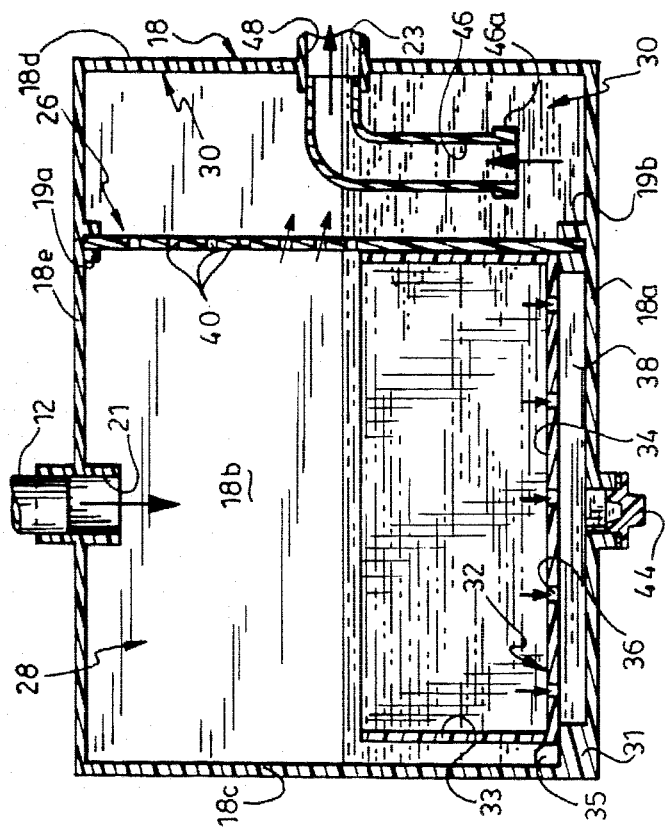

FILTERING APPARATUS FOR SINK DRAIN PIPE

FIELD OF THE INVENTION

The present invention relates to a filtering apparatus to be installed on a pipe to filter the water running therein, and more particularly to a filtering apparatus to be installed to the outlet pipe of a sink.

BACKGROUND OF THE INVENTION

U.S. Pat. No. 3,814,261 issued Jun. 4, 1974 to Filter Specialists, Inc. (inventor: Howard MORGAN) discloses a filter assembly including a housing having a fluid inlet and a water outlet. A perforated basket lined with a filter sheet is fitted and supported within the housing in spaced relationship from the U-shape housing. A fluid is fed into the housing, and macroparticulate fluid contaminants are screened through the filter basket, wherein purified water engages in the U-gap between the basket and the housing wall, before escape through a bottom outlet port.

An important problem with this filter system is that the interval between successive maintenance interventions thereof is short. This interval is short, because the macroparticulate contaminant screened from the fluid deposit on the filter lining, thus clogging the screening bores of the filter lining. Once a layer of contaminant deposit has built up, the filter becomes inoperative with respect to its filtering properties.

OBJECTS OF THE INVENTION

The main object of the invention is to provide a simple, low-cost water purification system for the drain pipe of a domestic sink.

A further object of the invention is that the purification system integrate the siphon assembly of the drain pipe.

SUMMARY OF THE INVENTION

In accordance with the objects of the invention, there is disclosed a combined siphon and water filtration system for use with a sink, comprising: (a) a main housing member, circumscribing an enclosure being subdivided into first and second compartments by an intermediate upright partition wall, and defining a flooring; (b) a fluid intake means, mounted into an upper portion of said first compartment and adapted to be fluidingly connected to the drain pipe of the sink for fluid flow into said first compartment; (c) a water outlet means, mounted into an intermediate section of said second compartment and adapted to be fluidingly connected to a sewer line; wherein said partition wall defines a lower water-tight portion and an upper portion having a plurality of bores, said bores sized for macroparticulate contaminant screening of said fluid, wherein upon fluid level exceeding the lower edge of said partition wall upper portion, purified water only is allowed to flow through said partition wall upper portion and into said second compartment; (d) a tray, sized for freely fitting inside said first compartment and releasably engaged thereinto and supported by said flooring for collecting and accumulating the macroparticulate contaminant screened by said partition wall upper portion during fluid flow therethrough; and (e) siphon means, mounted into said second compartment and operatively coupled to said water outlet means, for escape of said purified water from said enclosure outwardly of said housing member to the sewers.

Preferably, an access door is releasably mounted in fluid-tight fashion to said housing for access to said tray inside said second compartment for periodic cleansing of said tray from deposited macroparticulate contaminants.

Said tray could include a perforated bottom base wall; and further including a water outlet port, mounted to said flooring in register with said tray, and a closure plug, releasably sealing said water outlet port, whereby water below the level of said perforated portion of the partition wall can be released from said second compartment by removing said closure plug before opening said access door.

Biasing means could also be provided, for biasing said tray flatly against said partition wall.

Preferably, said siphon means includes an elbowed siphon pipe having an outer end, fluidingly coupled to said water outlet means through an upright side wall of said housing member, and a bottom water intake port, located spacedly proximate said housing flooring; said siphon pipe outer end being located at the level of the bottom edge of said perforated partition wall upper portion.

DESCRIPTION OF THE DRAWINGS

In the annexed drawings:

FIG. 1 is a front elevation of the filtering apparatus of the invention, partially showing the sink and pipes linked thereto;

FIG. 2 is a horizontal sectional view of the apparatus taken along line 2—2 of FIG. 1;

FIG. 3 is a sectional view at an enlarged scale, taken along line 3—3 of FIG. 2;

FIG. 4 is a perspective view, at an enlarged scale, of the area circumscribed in circle 4 of FIG. 3;

FIG. 5 is a side elevation of the apparatus, taken along line 5—5 of FIG. 1;

FIG. 6 is a sectional view taken along line 6—6 of FIG. 2;

FIG. 7 is a view, at an enlarged scale, of the area circumscribed in circle 7 of FIG. 5; and FIG. 8 is a partial fragmentary perspective view of the housing of the filtering apparatus.

DETAILED DESCRIPTION OF THE EMBODIMENTS

FIG. 1 shows the lower portion of a conventional sink 10 having a base wall 11 with a central outlet port 11a. To outlet port 11a is sealingly mounted a downwardly oriented outlet pipe 12 via a funnel shape coupling member 13. Sink outlet pipe 12 opens at its bottom end into the enclosure 15 of a large ground standing box-like housing 14, sealingly through an inlet 19 in the top wall 18e thereof. Preferably, inlet 19 is circumscribed by a transverse sleeve member 21, integral to wall 18e and projecting upwardly and downwardly therefrom. The flooring 18a of housing 14 is supported spacedly over ground F by corner legs 20. A filtered water elbowed outlet duct 16 interconnects enclosure 15 to a main sewer line (not shown), via a coupling 23 mounted through a side wall 18d of the housing 14.

The enclosure 15 circumscribed by housing 14 includes a filtering apparatus 18 according to the invention, detailed hereinbelow. One side of housing 14 adjacent opposite walls 18c and 18d forms a large opening 21, for access to the enclosure 15. A door panel 22 releasably closes mouth 21, and edgewisely abuts against integral flanges 43 transversely internally carried by the top wall 18e, opposite side walls 18d and 18c, and flooring 18a. Door panel 22 is releasably anchored to peripheral flanges 43 by a plurality of bolts 24. A continuous sealing strip 25 lines flanges 43 (FIG. 7), to provide fluid-tight interconnection with door panel 22 when flanges 43 are anchored thereto with bolts 24.

FIG. 2 shows that casing 18 is divided in two compartments 28 and 30 by an upright partition wall 26, extending at a position intermediate housing walls 18c and 18d, and mounted to top and bottom walls 18e, 18a, by edgewisely engaging complementary facing rails 19a, 19b, that are integral to top and bottom walls 18e, 18a, respectively. It is noted that flanges 23 are discontinuous about rails 19a and 19b, as illustrated in FIG. 8; however, sealing strip 25 should be continuous, extending along all the peripheral edge of housing mouth 21, to provide fluid-tight seal. Larger compartment 28 forms a waste water chamber, while smaller compartment 30 forms a filtered water chamber.

As illustrated in FIGS. 2, 5 and 6, a basket member 32 is freely mounted into the waste water chamber 28, in underlying register with vertical outlet pipe 12. Basket member 32 includes a peripheral side wall 33, having a shape complementary to that of housing 14, but of slightly smaller size so as to freely fit therein, and an integral flooring 34. Wall 33 of basket 32 extends upwardly to a fraction of the total height of side walls 18b–18d, e.g. approximately one third of the total height thereof. The bottom wall 34 is perforated, having a plurality of through-bores 36, and is supported spacedly over the main housing flooring 18a by support means. These support means includes:

a raised edge strip 31, integrally mounted to the bottom edge of side wall 18c and also integral to and overlying the side edge of flooring 18a; and the lower rail 19b, integral to and overlying flooring 18a and located intermediately of side walls 18c and 18d and extending parallel to edge strip 31;

wherein a small horizontal chamber 38 is defined between walls 34 and 18a.

In addition, raised edge strip 31 carries adjacent rear wall 18b an integral upturned corner block 35 (FIG. 8). As suggested in FIG. 6, corner block 35 constitutes a spacer member that defines a gap between housing wall 18c and the corresponding basket side wall 33, and for biasing basket member 32 abuttingly against the lower portion of intermediate partition wall 26.

Basket 32 is destined to capture and retain macroparticulate debris material admixed with the fluid coming out of sink 10 through pipe 12.

Partition wall 26 includes an upper wall portion that is perforated with a plurality of bores, 40, for fluid communication between compartments 26 and 28. This perforated upper wall portion of wall 26 should be located generally above the level of basket 32. The partition bores 40 and the basket bores 36 are diametrally sized to prevent through passage of macroparticulate contaminants (in the fluid) of a size beyond a given threshold value. For example, each of bores 36 and 40 may have a diameter ranging between 1 and 10 millimeters, wherein water flow therethrough is unhampered while macroparticulate contaminants are effectively screened.

Accordingly, as the fluid level inside compartment 28 raises to reach the level of perforated upper portion of partition wall 26, the water component of the fluid will flow through the partition bores 40 into adjacent compartment 30, while the screened macroparticulate contaminants component of the fluid will remain inside compartment 26, to eventually fall under gravity into and be retained by the basket 32. With time, debris will build up in basket 32, until it becomes necessary to release the basket 32 from the compartment 28 for removing the debris therefrom.

Access to main compartment 28 can be gained by removing upright door 22, by unscrewing peripheral bolts 24. However, before opening door 22, it will of course be preferable to evacuate the water from compartment 28. This can be done by providing a bottom water outlet port 42 in flooring 18a, in register with compartment 26, e.g. coaxial with top fluid inlet 21 as suggested in FIGS. 5 and 6. Bottom outlet port 42 will normally be sealed by a closure plug 44, but once water needs to be evacuated from compartment 28 before release of basket 32, as above-noted, plug 44 will be removed and water from compartment 28 will be allowed to escape through outlet port 42 and into a collecting bucket (not shown) temporarily positioned beneath the compartment 28.

In compartment 30, an elbowed siphon pipe duct 46 is mounted to the interior end mouth of coupling 23 of side wall 18d, with the lower free end mouth 46a of siphon 46 extending downwardly and located spacedly proximate housing flooring 18a. The water outlet port 48 circumscribed by coupling 23 in upright wall 18d is in horizontal register with the lower edge of the perforated upper section of partition wall 26. Hence, as the water level raises in compartment 30, following overflow of the water from adjacent main compartment 28 through the partition wall bores 40, water level also raises inside the vertical leg of siphon pipe 46 by engaging through bottom mouth 46a. Once water level inside siphon 46 reaches the horizontal leg thereof, water begins to flow through the wall outlet port 48 and the coupling 23, to engage into the horizontal leg of the exterior outlet duct 16. Water is then evacuated to the sewers via the downwardly inclined (e.g. vertical) leg of the exterior outlet duct 16, for example extending through a channel 50 (FIG. 1) in flooring F.

Hence, the general siphon principle is maintained for the sink, with the added convenience of a passive water filtration system being serially connected to the sink outlet duct. The present invention is particularly suitable for bars where cigarette butts, cocktail spoons, and the like large refuse objects are sometimes accidentally lost to the sink drain and eventually clog the drain pipe thereof. The conventional S-shape siphon pipe is accordingly replaced by the elbowed siphon pipe 46 and associated elbowed water outlet duct 16.

I claim:

1. A combined siphon and water filtration system for use with a sink, comprising:

(a) a main housing member, circumscribing an enclosure being subdivided into first and second compartments by an intermediate upright partition wall, and defining a flooring;

(b) a fluid intake means, mounted into an upper portion of said first compartment and adapted to be fluidingly connected to the drain pipe of the sink for fluid flow into said first compartment;

(c) a water outlet means, mounted into an intermediate section of said second compartment and adapted to be fluidingly connected to a sewer line;

wherein said partition wall defines a lower water-tight portion and an upper portion having a plurality of bores, said bores sized for macroparticulate contaminant screening of said fluid, wherein upon fluid level exceeding the lower edge of said partition wall upper portion, purified water only is allowed to flow through said partition wall upper portion and into said second compartment;

(d) a tray, sized for freely fitting inside said first compartment and releasably engaged thereinto and supported by said flooring for collecting and accumulating the macroparticulate contaminant screened by said partition wall upper portion during fluid flow therethrough; and (e) siphon means, mounted into said second compartment and operatively coupled to said water outlet means, for escape of said purified water from said enclosure outwardly of said housing member to the sewers.

2. A siphon and water filtration system as defined in claim 1, further including an access door, releasably mounted in fluid-tight fashion to said housing for access to said tray inside said second compartment for periodic cleansing of said tray from deposited macroparticulate contaminants.

3. A siphon and water filtration system as defined in claim 2, wherein said tray includes a perforated bottom base wall; and further including a water outlet port, mounted to said flooring in register with said tray, and a closure plug, releasably sealing said water outlet port, whereby water below the level of said upper portion of the partition wall can be released from said second compartment by removing said closure plug before opening said access door.

4. A siphon and water filtration system as defined in claim 1, further including biasing means, for biasing said tray flatly against said partition wall.

5. A siphon and water filtration system as defined in claim 1, wherein said siphon means includes an elbowed siphon pipe having an outer end, fluidically coupled to said water outlet means through an upright side wall of said housing member, and a bottom water intake port, located spacedly proximate said housing flooring; said siphon pipe outer end being located at the level of the bottom edge of said upper portion of the partition wall.

\* \* \* \* \*